(12) United States Patent
Kumar

(10) Patent No.: US 10,614,349 B2
(45) Date of Patent: Apr. 7, 2020

(54) CLOUD BASED AUTHENTICATION OF OBJECTS

(71) Applicant: Walmart Apollo, LLC, Bentonville, AR (US)

(72) Inventor: Rakesh Kumar, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/978,880

(22) Filed: May 14, 2018

(65) Prior Publication Data

US 2018/0330212 A1 Nov. 15, 2018

Related U.S. Application Data

(60) Provisional application No. 62/506,214, filed on May 15, 2017.

(51) Int. Cl.
| | | |
|---|---|---|
| *G06K 5/00* | (2006.01) | |
| *G06F 17/00* | (2019.01) | |
| *G06K 19/06* | (2006.01) | |
| *G06K 7/10* | (2006.01) | |
| *H04L 9/08* | (2006.01) | |
| *H04L 9/32* | (2006.01) | |
| *G09C 5/00* | (2006.01) | |

(52) U.S. Cl.
CPC .... *G06K 19/06037* (2013.01); *G06K 7/10118* (2013.01); *G09C 5/00* (2013.01); *H04L 9/0877* (2013.01); *H04L 9/3226* (2013.01); *H04L 9/3234* (2013.01)

(58) Field of Classification Search
USPC ............ 235/375, 382, 383, 385, 462.01
See application file for complete search history.

(56) References Cited

U.S. PATENT DOCUMENTS

| | | | | |
|---|---|---|---|---|
| 5,660,925 A | * | 8/1997 | Cooley | G09F 3/0292 |
| | | | | 428/195.1 |
| 6,263,120 B1 | * | 7/2001 | Matsuoka | G06T 3/403 |
| | | | | 382/300 |
| 6,415,983 B1 | | 7/2002 | Ulvr et al. | |

(Continued)

FOREIGN PATENT DOCUMENTS

| | | |
|---|---|---|
| WO | 2013017738 A1 | 2/2013 |
| WO | 2013170009 A1 | 11/2013 |

OTHER PUBLICATIONS

Fellman, Megan, Invisible Inks could Help Foil Conterfeiters, Northwestern University News, http://www.northwestern.edu/newscenter/stories/2015/04/invisibleinkscouldhelpfoilcounterfeiters. html, Apr. 22, 2015.

(Continued)

*Primary Examiner* — Tuyen K Vo
(74) *Attorney, Agent, or Firm* — McCarter & English, LLP; David R. Burns

(57) ABSTRACT

Exemplary embodiments of the present disclosure are related to a cloud-based system in which portable electronic devices communicate with computing systems to implement one or more actions or operations for verifying authenticity of a physical object. Embodiments of the cloud-based product authentication system can include the portable electronic devices, an identification generating device, and a computing system connected to a cloud environment.

19 Claims, 6 Drawing Sheets

(56) References Cited

U.S. PATENT DOCUMENTS

| | | |
|---|---|---|
| 7,264,169 B2 | 9/2007 | Juds |
| 7,337,971 B2 | 3/2008 | Melick et al. |
| 7,739,509 B2 | 6/2010 | Silverbrook et al. |
| 8,649,512 B2 | 2/2014 | Grant |
| 2005/0199723 A1* | 9/2005 | Lubow ............... G06K 1/18 235/462.01 |
| 2007/0241177 A1* | 10/2007 | Tuschel ......... G06K 19/06028 235/375 |
| 2008/0149713 A1* | 6/2008 | Brundage ............ G06T 1/0071 235/435 |
| 2009/0169019 A1* | 7/2009 | Bauchot ............... G06F 21/10 380/278 |
| 2009/0283583 A1* | 11/2009 | Cowburn ............ G06Q 10/087 235/375 |
| 2011/0192906 A1* | 8/2011 | Wilds .................. G06K 19/14 235/468 |
| 2013/0230166 A1* | 9/2013 | Bauchot ............... H04L 9/0816 380/44 |
| 2013/0335783 A1 | 12/2013 | Kurtz et al. |
| 2014/0270467 A1 | 9/2014 | Blemel et al. |
| 2015/0134552 A1* | 5/2015 | Engels .................. H04W 4/80 705/318 |
| 2015/0244807 A1* | 8/2015 | Shoemake ........... H04L 67/125 709/202 |
| 2016/0027042 A1 | 1/2016 | Heeter |
| 2016/0072626 A1* | 3/2016 | Kouladjie ............. G06F 21/36 713/189 |
| 2016/0307005 A1* | 10/2016 | Poon ............... G06K 19/06056 |

OTHER PUBLICATIONS

Specialist barcode applications, spirit Data Capture LTD, last viewed Sep. 30, 2016.

Invisible ink for secret data, product and document security, Science X Network, http://phys.org/news/201601invisibleinksecretproductdocument. html, Jan. 26, 2016.

International Search Report and Written Opinion from related International Patent Application No. PCT/US2018/032551 dated Jul. 26, 2018.

* cited by examiner

CLOUD BASED AUTHENTICATION OF OBJECTS

CROSS REFERENCE TO RELATED APPLICATIONS

This application claims priority to U.S. Provisional Application No. 62/506,214, filed on May 15, 2017, the disclosure of which is incorporated by reference herein in its entirety.

BACKGROUND

Currently it can be difficult to verify and validate authenticity of objects. Generally printed labels associated authentic objects can be easily replicated for use with counterfeit objects. Some printed labels have attempted to use holograms or watermarks, but such printed labels are still susceptible to replications and are not cost effective.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
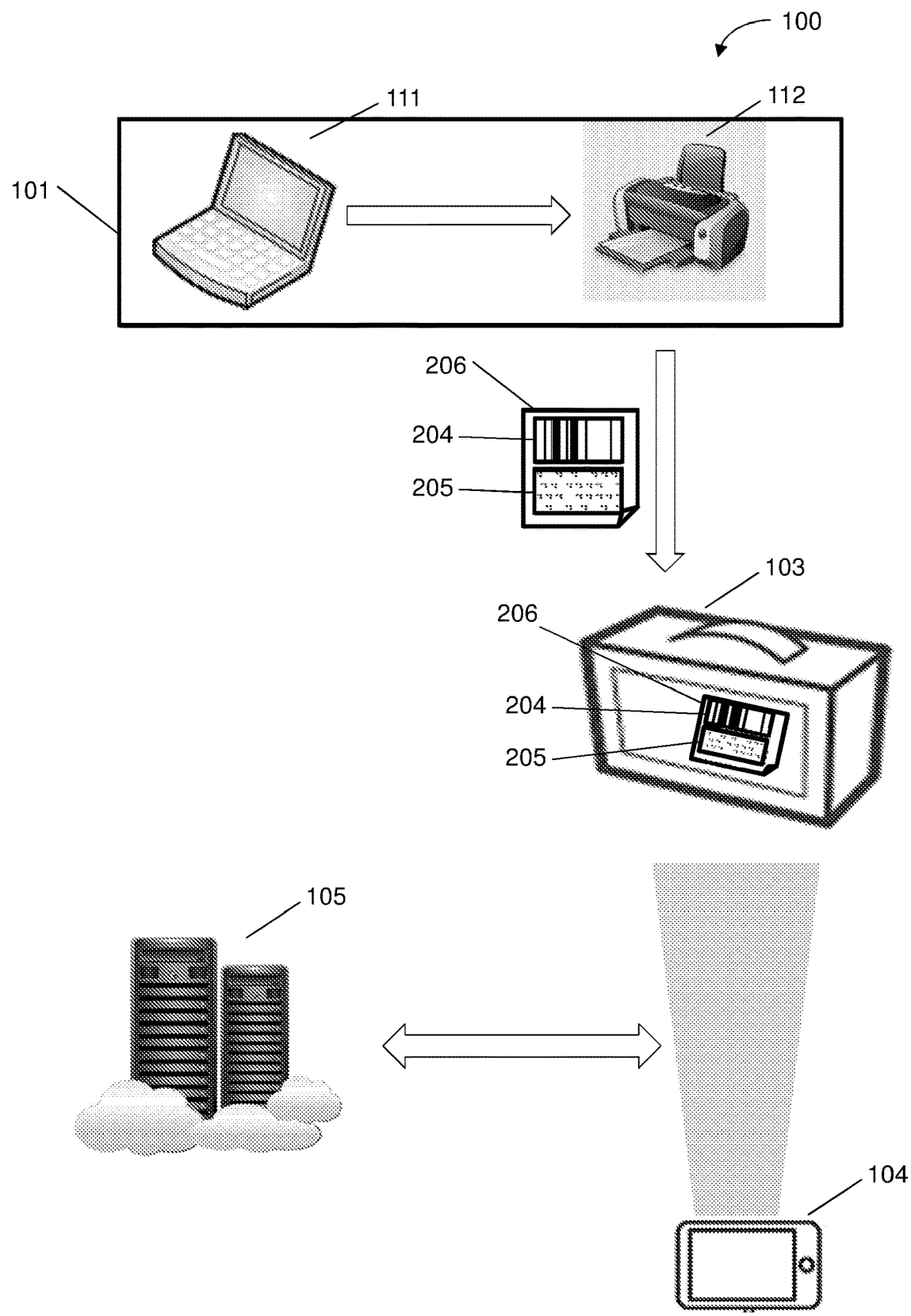
FIG. 1 illustrates of an exemplary cloud based product authentication system in accordance with embodiments of the present disclosure.

Exemplary embodiments of the present disclosure are related to a cloud-based system in which portable electronic devices communicate with remote computing systems to implement one or more actions or operations for verifying authenticity of a physical object based on one or more printed object identification documents associated with, affixed to, or integrally formed with the physical object. Embodiments of the cloud-based product authentication system can include an identification document generating device and a computing system connected to a cloud environment.

In accordance with embodiments of the present disclosure, the product authentication system uses cloud based technologies to generate unique cypher-based printed object identification documents for physical objects, where the cypher-based printed object identification documents can subsequently be used for cloud based authentication of the printed object identification documents and the physical objects. A mobile device can be used to verify the object identity from anywhere and at any time. For example, a unique cypher based object ID can be generated by a computing device, and the generated object ID can be embedded on an identification document. Examples of identification documents can include a printed label or tag, a sticker, indicia formed on a physical object, indicia formed on packaging associated with the physical object, or any kind of identification document. The generated object ID may also be printed on the object identification documents in the form of a barcode, for example, one-dimensional (1D) barcode or two-dimensional (2D) barcode. The object identification document, which includes the object ID and the barcode, can be printed using fluorescent ink which is generally invisible to the naked eye of a human, but which responds to LED flash light and can be captured by an image capturing device that uses an LED flash. After a physical object is manufactured and the object identification document is associated with, affixed to, or integrally formed on the physical object, a user can verify the authenticity of the physical object using, for example, a smart phone light source, which may be a dedicated mobile app, to take a picture of the object identification document, and then send the picture to cloud based authenticity services. The cloud based services can decode the received information and send an associated authentication result to the smart phone of the user. Exemplary embodiments of the object identification documents and the cloud based authenticity service can make the object identification documents less prone to tempering and duplication. Further, the authentication and verification of an object identification document is dynamically performed in the cloud environment.

Exemplary embodiments of the present disclosure are described using a non-limiting illustrative object identification document in the form an object label. Exemplary embodiments of the present disclosure can utilize other object identification documents, such as stickers, printed indicia on the physical object, printed indicia on the packaging of the physical object, and/or any other suitable object identification documents.

Exemplary embodiments of the present disclosure provide a cloud-based system for verifying authenticity of a physical object using a mobile device. The cloud-based system includes an identification generating device and a computing system connected to a cloud environment. The identification generating device is configured to generate an unique cipher based identifier for the physical object by encoding an object identifier of the physical object with a cypher key, converting the unique cipher based identifier to a cypher dot based identifier, generating a machine-readable representation corresponding to the cypher dot based identifier, and printing the cypher dot based identifier and the machine-readable representation on an identification document (e.g., a label) for the physical object. The identification documents (e.g., label) is affixed to the physical object. The computing system can be connected to a cloud environment, and can be configured to receive, from the mobile device, an image of the identification document captured by a camera of the mobile device under a flash from the mobile device, extract the cypher dot based identifier and the machine-readable representation from the captured image, convert the cypher dot based identifier to the unique cipher based identifier, obtain a first instance of the object identifier by decoding the unique cipher based identifier with the cypher key, obtain a second instance of the object identifier by decoding the machine-readable representation, verify authenticity of the physical object based on the first and second instances of the object identifier, and transmit the authenticity of the physical object to the mobile device. The cypher dot based identifier in the captured image can be converted to the unique cypher based identifier using frequency domain matching. The machine-readable representation can be a barcode.

The cypher dot based identifier can be printed on the label using invisible ink. The invisible ink can be fluorescent ink that is excited under a light emitting diode flash, and the image of the label is captured by the camera of the mobile device when the light emitting diode flash is on.

In accordance with embodiments of the present disclosure, an exemplary method for verifying authenticity of an item using a mobile device in communication with a cloud environment is provided. The method includes generating an unique cypher based identifier for the physical object by encoding an object identifier of the physical object with a cypher key, converting the unique cypher based identifier to a cypher dot based identifier, generating a machine-readable representation corresponding to the cypher dot based identifier, printing the cypher dot based identifier and the machine-readable representation on a label, receiving, from the mobile device, an image of the label captured by a camera of the mobile device, extracting the cypher dot based identifier and the machine-readable representation from the captured image, converting the cypher dot based identifier to the unique cypher based identifier, obtaining a first instance of the object identifier by decoding the unique cypher based identifier with the cypher key, obtaining a second instance of the object identifier by decoding the machine-readable representation, verifying authenticity of the physical object based on the first and second instances of the object identifier, and transmitting the authenticity of the physical object to the mobile device. The method include can establishing communication between the cloud environment and the mobile device and/or generating the cypher dot based identifier corresponding to the machine-readable representation acquired from the captured image.

In accordance with embodiments of the present disclosure, an exemplary non-transitory computer-readable medium storing instructions that are executable by a processing device is provided, and execution of the instructions by the processing device causes the processing device to generate an unique cypher based identifier for the physical object by encoding an object identifier of the physical object with a cypher key, convert the unique cypher based identifier to a cypher dot based identifier, generate a machine-readable representation corresponding to the cypher dot based identifier, print the cypher dot based identifier and the machine-readable representation on a label, establish communication between a cloud environment and a mobile device, receive, from the mobile device, an image of the label captured by a camera of the mobile device, extract the cypher dot based identifier and the machine-readable representation from the captured image, convert the cypher dot based identifier to the unique cypher based identifier, obtain a first instance of the object identifier by decoding the unique cypher based identifier with the cypher key, obtain a second instance of the object identifier by decoding the machine-readable representation, verify authenticity of the physical object based on the first and second instances of the object identifier, and transmit the authenticity of the physical object to the mobile device.

Any combination and/or permutation of embodiments is envisioned. Other objects and features will become apparent from the present disclosure considered in conjunction with the accompanying illustrative drawings.

FIG. 1 is a block diagram of an exemplary cloud based object authentication system 100 (hereinafter "system 100") of the present disclosure. In the system 100, an identification generating device 101 creates an object label or packaging label based on a cypher associated with a unique object identifier (ID). For example, the identification generating device 101 includes computing device 111 and a printer 112. The computing device 111 can generate a cypher based identifier for each physical object by encoding the unique object ID using a cypher key. The computing device 111 or the printer 112 can convert the cypher based identifier to a cypher dot based identifier 205 and the printer 112 can print the cypher dot based identifier on a label 206. The printer 112 can also print a machine-readable representation 204 on the label that includes the object identifier, the cypher key, and/or the cypher based identifier. In exemplary embodiments, the machine-readable representation 204 can be a 1D or 2D barcode. Both the cypher dot based identifier 205 and the machine-readable representation 204 can be printed on the label 206 using invisible ink, such as fluorescent ink, which is generally invisible the naked eye of a human, but that can be excited under a light emitting diode (LED) flash and captured by a camera associated with the flash. In some embodiments, the label 206 may only include one of the cypher dot based identifier 205 and the machine-readable representation 204 or only the cypher dot based identifier 205 may be printed in invisible ink, while the machine-readable representation 204 can be printed in visible ink.

As shown in FIG. 1, the label 206 can be attached to a physical object 103. After the label 206 is attached to the physical object, a user can verify the authenticity of the physical using a mobile device 104, such as a smartphone or tablet computer. In one embodiment, the consumer can take a picture of the label 206 (i.e. capture an image of the label 206) when the LED flash of the mobile device 104 is on, and can send the picture to a cloud based server 105. The cloud based server can identify the cypher dot based identifier 205 revealed in the picture as a result of capturing the picture with the flash and can apply frequency domain matching to extract the cypher based identifier from the cypher dot identifier. The cloud based server can decode the cypher based identifier using the cypher key to obtain the object ID, and can send the verified result to the mobile device 104 if the object ID corresponds to an expected object ID stored in a database associated with the cloud based server. For embodiments in which the machine-readable representation 204 is printed on the label 206 and includes the cypher key, the cloud based server can obtain the cypher key by decoding the barcode. For embodiments in which the machine-readable representation 204 is not printed on the label 206 or the cypher key is not included in the machine-readable representation 204, the cloud based server can store the cypher key. For embodiments in which the object ID encoded in the machine-readable representation 204 printed on the label 206, the cloud based server can compare the object ID extracted from the cypher dot based identifier 205 in the picture to the object ID decoded from the machine-readable representation 204 in the picture. If the object IDs match, the cloud based server can authenticate the label 206.

Figure 2:
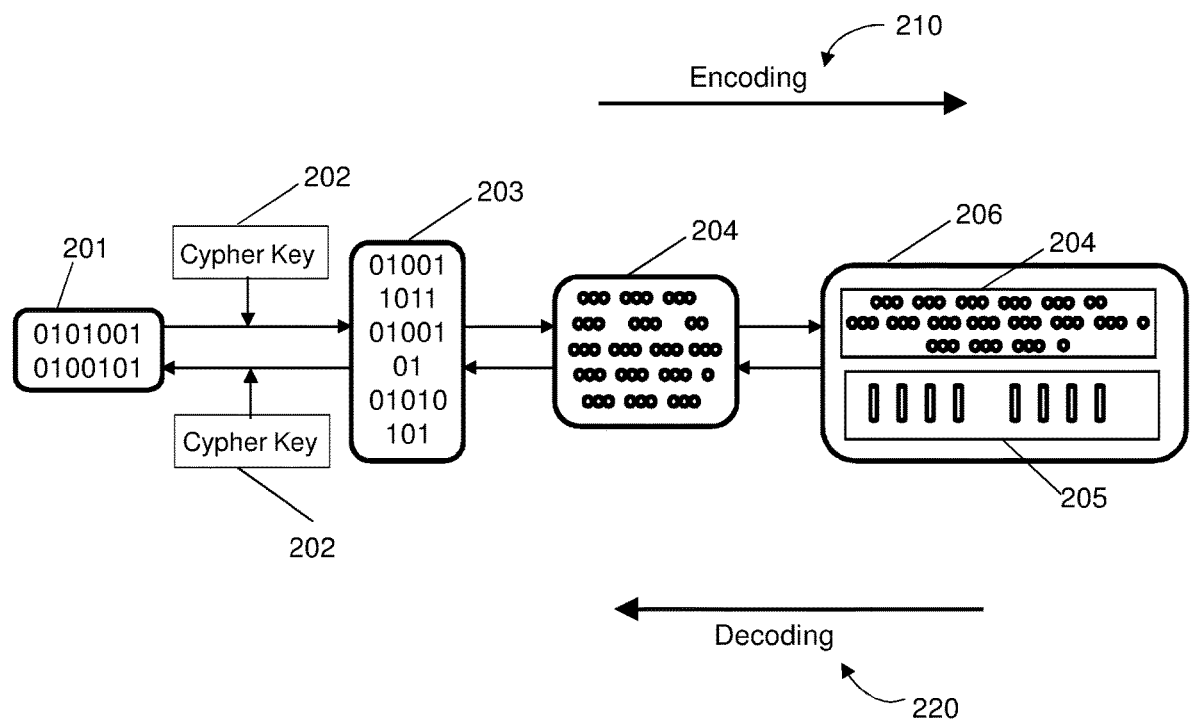
FIG. 2 shows exemplary encoding and decoding processes in accordance with embodiments of the present disclosure.

FIG. 2 shows exemplary encoding and decoding processes in accordance with embodiments of the present disclosure. In an exemplary encoding process 210, an identification generating device can encode a unique object identifier (ID) 201 with a cypher key 202 to generate an unique cypher based identifier 203. Then the unique cypher based identifier 203 is converted to the cypher dot based identifier 204 based on a cypher dot encoder, where the pattern and spacing between certain dots can correspond to the elements of the cypher based identifier 203. A machine-readable representation 205, such as a barcode, can be generated according to the object ID 201, the cypher key 202, the cypher based identifier 203, and/or the cypher dot based identifier 204.

As shown in FIG. 2, in an exemplary decoding process 220, when a cloud based server receives an image of the label 206 under a flash, the cypher dot based identifier 204 and the machine-readable representation 205 can be extracted. The cypher dot based identifier 204 can be converted to the unique cypher based identifier 203 by recovering scale orientation (e.g. spacing and pattern of the cypher dots) and using frequency domain matching. Then the computing system can obtain the unique object ID 201 by decoding the unique cypher based identifier 203 with the cypher key 202, which is either known to the cloud based server or is extracted from the machine-readable representation. The object ID can be compared to a an expected object ID to authenticate the label 206 and/or the physical object to which the label 206 is attached. For embodiments in which the object ID is encoded in the machine-readable representation 205, the unique object identifier 201 can also be obtained by decoding the machine-readable representation 205. The object ID extracted from the cypher dot based identifier can be compared to the object ID extracted from the machine readable representation to authenticate the label 206 and/or the associated physical object and/or the object IDs extracted from the cypher dot based identifier and the machine-readable identifier can be compared against an expected object ID. Therefore, the obtained unique object identifier 201, which is uniquely associated with the physical object, can be used to verified the authenticity of the label 206 and/or the physical object by the cloud based server.

Figure 3:
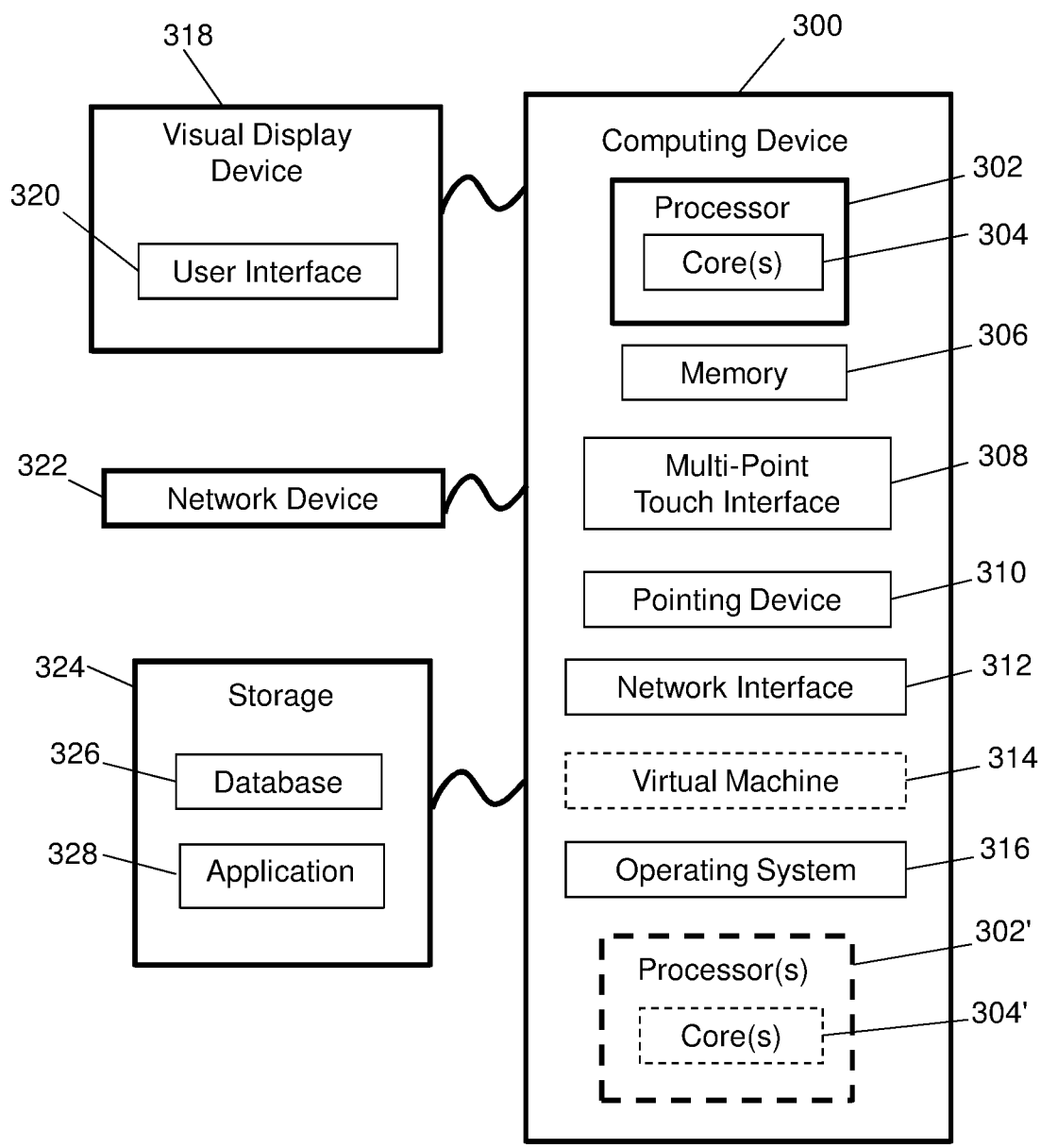
FIG. 3 is an exemplary computing device for implementing embodiments of the present disclosure.

FIG. 3 is a block diagram of a computing device 300 in accordance with exemplary embodiments of the present disclosure. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software (e.g., applications 328, such as encoding and decoding processes) for implementing exemplary embodiments of the present disclosure (e.g., instructions for operating the identification generating device 101, instructions for operating the mobile device 104, instructions for operating the cloud based server 105, combinations thereof, or the like). The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device 300 may be shared dynamically. A virtual machine 314 may be provided to handle a process running on multiple processors so that the process appears to be using only one computing resource rather than multiple computing resources. Multiple virtual machines may also be used with one processor. Memory 306 may include a computer system memory or random access memory, such as DRAM, SRAM, EDO RAM, and the like. Memory 306 may include other types of memory as well, or combinations thereof.

A user may interact with the computing device 300 through a visual display device 318 (e.g., a personal computer, a mobile smart device, or the like), such as a computer monitor, which may display one or more user interfaces 320 (e.g., GUI 134) that may be provided in accordance with exemplary embodiments. The computing device 300 may include other I/O devices for receiving input from a user, for example, a keyboard or any suitable multi-point touch interface 308, a pointing device 310 (e.g., a mouse). The keyboard 308 and the pointing device 310 may be coupled to the visual display device 318. The computing device 300 may include other suitable conventional I/O peripherals.

The computing device 300 may also include one or more storage devices 324, such as a hard-drive, CD-ROM, or other computer readable media, for storing data and computer-readable instructions and/or software that implement exemplary embodiments of the system 100 described herein. Exemplary storage device 324 may also store one or more databases 326 for storing any suitable information required to implement exemplary embodiments. For example, exemplary storage device 324 can store one or more databases 326 for storing information, such as unique object ID 201, cypher key 202, unique cypher based identifier 203, cypher dot based identifier 204, and machine-readable representation 205, combinations thereof, or the like, and computer-readable instructions and/or software that implement exemplary embodiments described herein. The databases 326 may be updated by manually or automatically at any suitable time to add, delete, and/or update one or more items in the databases.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. Moreover, the computing device 300 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 300 may run any operating system 316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 316 may be run in native mode or emulated mode. In an exemplary embodiment, the operating system 316 may be run on one or more cloud machine instances.

Figure 4:
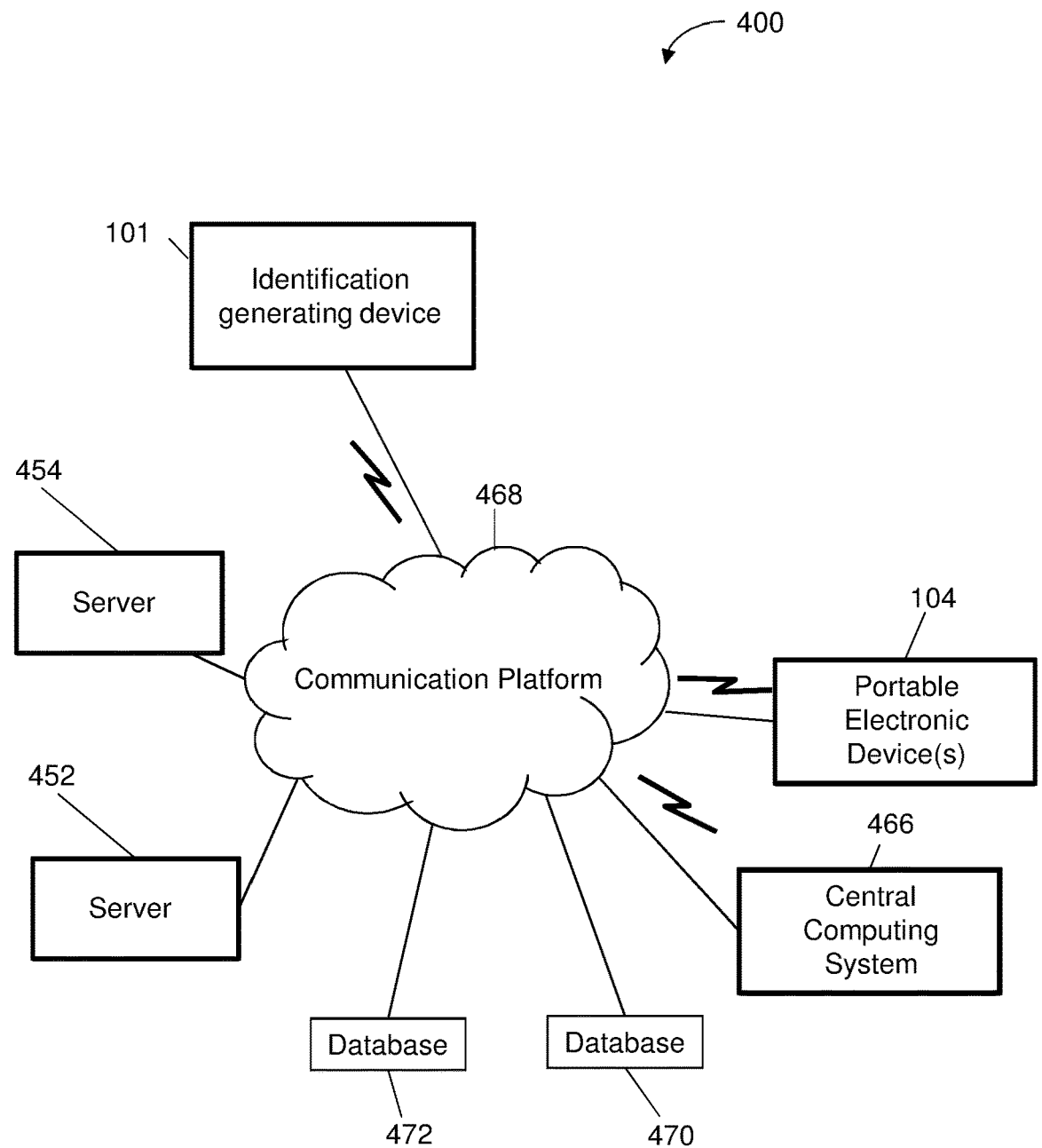
FIG. 4 is a block diagram of an exemplary environment for implementing a cloud based product authentication system in accordance with embodiments of the present disclosure.

FIG. 4 is a block diagram of an exemplary cloud based object authentication system environment in accordance with embodiments of the present disclosure. The environment 400 can include servers 452, 454 configured to be in communication with identification generating devices 101 via a communication platform 468, which can be any network over which information can be transmitted between devices communicatively coupled to the network. For example, the communication platform 468 can be the Internet, Intranet, virtual private network (VPN), wide area network (WAN), local area network (LAN), and the like. In some embodiments, the communication platform 468 can be part of a cloud environment. The environment 400 can include portable electronic devices 104 and central computing systems 466, which can be in communication with the servers 452, 454, as well as the identification generating devices 101, via the communication platform 468. The environment 400 can include repositories or databases 470, 472, which can be in communication with the servers 452, 454, as well as the identification generating devices 101, the portable electronic devices 104 and the central computing systems 466, via the communications platform 468.

In exemplary embodiments, servers 452, 454, identification generating devices 101, portable electronic devices 104, central computing systems 466, and databases 470, 472 can be implemented as computing devices (e.g., computing device 300). Those skilled in the art will recognize that the databases 470, 472 can be incorporated into one or more of the servers 452, 454 such that one or more of the servers 452, 454 can include databases 470, 472. In some embodiments, the database 470 can store unique object identifiers, the unique cipher based identifiers, cypher dot based identifiers, and machine-readable representations, and the database 472 can store cypher keys and/or cypher dot encoders described herein. In some embodiments, a single database 470, 472 can store the unique object identifiers, the unique cipher based identifiers, the cypher dot based identifiers, the machine-readable representations, and the cypher keys described herein.

Figure 5:
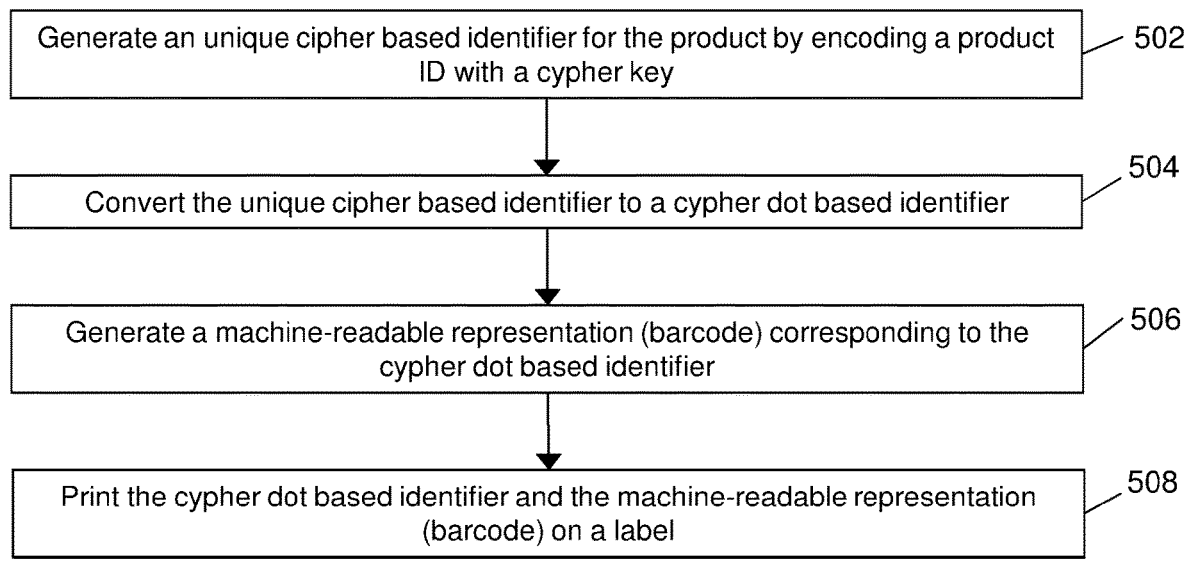
FIG. 5 show a flowchart illustrating a process implemented by an exemplary cloud based product authentication system for generating a printed label in accordance with embodiments of the present disclosure.

FIG. 5 show a flowchart illustrating a process implemented by an exemplary cloud based object authentication system in accordance with embodiments of the present disclosure. In step 502, the identification generating device can generate an unique cipher based identifier for each physical object by encoding each object ID with a cypher key. In step 504, the unique cipher based identifier can be converted to a cypher dot based identifier. Then in step 506, a machine-readable representation, such as a barcode, can be generated based on the object ID, the cypher key, the cypher based identifier, and/or the cypher dot based identifier. In step 508, the identification generating device can print an identification label with the cypher dot based identifier and the machine-readable representation embedded thereon. Alternatively, the identification label may include either one of the cypher dot based identifier and the machine-readable representation.

In one embodiment, the cypher dot based identifier and the machine-readable representation on the identification label can be printed using fluorescent ink. The fluorescent ink is invisible via ordinary eyes in normal scenario, but can be excited under a light emitting diode flash, making it difficult to duplicate.

Figure 6:
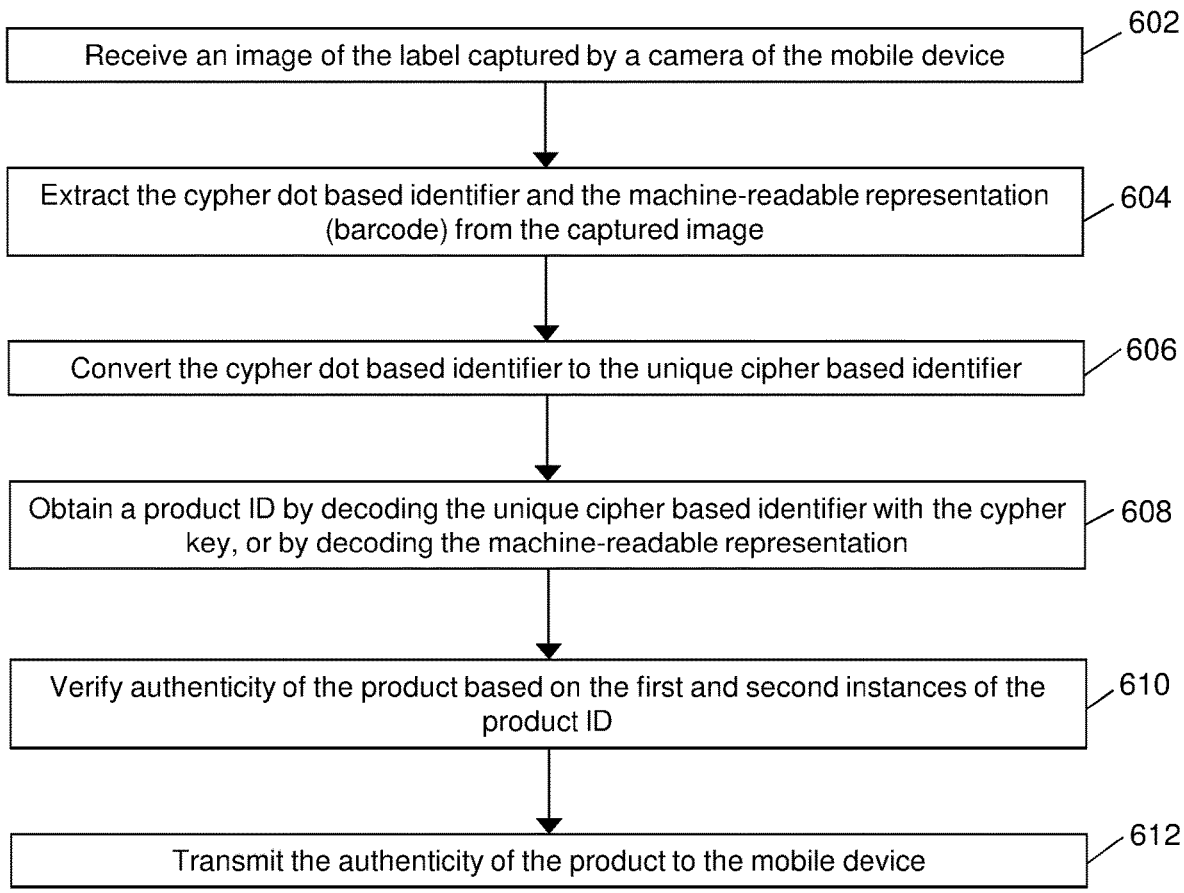
FIG. 6 show a flowchart illustrating a process implemented by an exemplary cloud based product authentication system for verifying authenticity of the printed label in accordance with embodiments of the present disclosure.

FIG. 6 show a flowchart illustrating a process implemented by an exemplary cloud based object authentication system for authenticating a label or a physical object associated with the label in accordance with embodiments of the present disclosure. To verify the authenticity of a label and/or a physical object associated with the label, a can turn on the light emitting diode (LED) flash light, e.g., on a mobile device, such as a cellphone or a tablet computer, and take a picture of an object identification label associated with the physical object when the LED flash is on using a camera of the mobile device. The object identification can be printed to include an array of cypher dots that form a cypher dot based identifier and a machine-readable representation, such as a barcode. The cypher dots can be printed using invisible ink, and the machine-readable representation can be printed using invisible or visible ink. The picture captured by the camera when the flash is on can reveal the invisible ink such that the cypher dots are readily observable by a computing device. The captured picture of the object identification label can be sent to the cloud based server using a mobile app on the mobile device.

After the computing system of the cloud based server receives the picture of the object identification label from the mobile device in step 602, in step 604, the cypher dot based identifier and the machine-readable representation are extracted from the received image. Then in step 606, the extracted cypher dot based identifier can be converted to the unique cipher based identifier. In step 608, an object ID can be obtained by decoding the unique cipher based identifier with a cypher key. In another embodiment, the object ID can also be obtained by decoding the machine-readable representation, which can be extracted from the captured image of the object identification label. In such embodiments, the object ID obtained by extracted from the cypher dot based identifier can be identical to the object ID obtained by decoding the machine-readable representation if the object identification label and/or the physical object are authentic.

Based on the obtained object ID, the cloud based server verifies the authenticity of the physical object in step 610, for example, by comparing the obtained object ID(s) with expect object IDs stored in the database. Then in step 612, the cloud server can transmit the verification result to the mobile device to notify the user of whether the label and/or physical object is authentic.

In exemplary embodiments, the authenticity of the product is dynamically verified via the cloud environment.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

FIG. 8 is a block diagram of an example computing device for implementing exemplary embodiments of the present disclosure. Embodiments of the computing device 800 can implement embodiments of the blockchain ownership storage system. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 806 included in the computing device 800 may store computer-readable and computer-executable instructions or software (e.g., applications 830 such as the control engine 820) for implementing exemplary operations of the computing device 800. The computing device 800 also includes configurable and/or programmable processor 802 and associated core(s) 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for implementing exemplary embodiments of the present disclosure. Processor 802 and processor(s) 802' may each be a single core processor or multiple core (804 and 804') processor. Either or both of processor 802 and processor(s) 802' may be configured to execute one or more of the instructions described in connection with computing device 800.

Virtualization may be employed in the computing device 800 so that infrastructure and resources in the computing device 800 may be shared dynamically. A virtual machine 812 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof. The computing device 800 can receive data from input/output devices such as, an image capturing device 834. The image capturing device 834 can capture still or moving images. A user may interact with the computing device 800 through a visual display device 814, such as a computer monitor, which may display one or more graphical user interfaces 816, multi touch interface 820 and a pointing device 818.

The computing device 800 may also include one or more storage devices 826, such as a hard-drive, CD-ROM, or other computer readable media, for storing data and computer-readable instructions and/or software that implement exemplary embodiments of the present disclosure (e.g., applications such as the control engine 820). For example, exemplary storage device 826 can include one or more databases 828 for storing information associated with representations of digital IP work and ownership associated with the representations of the digital IP work. The databases 828 may be updated manually or automatically at any suitable time to add, delete, and/or update one or more data items in the databases.

The computing device 800 can include a network interface 808 configured to interface via one or more network devices 824 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 822 to facilitate wireless communication (e.g., via the network interface) between the computing device 800 and a network and/or between the computing device 800 and other computing devices. The network interface 808 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

The computing device 800 may run any operating system 810, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 800 and performing the operations described herein. In exemplary embodiments, the operating system 810 may be run in native mode or emulated mode. In an exemplary embodiment, the operating system 810 may be run on one or more cloud machine instances.

The invention claimed is:

1. A cloud-based system for verifying authenticity of a physical object using a mobile device, the cloud-based system comprising:
   an identification generating device configured to:
      generate an unique cipher based identifier for the physical object by encoding an object identifier of the physical object with a cypher key;
      convert the unique cipher based identifier to a cypher dot based identifier;
      generate a machine-readable representation corresponding to the cypher dot based identifier based on the object identifier of the physical object; and
      print the cypher dot based identifier and the machine-readable representation on a label;
   a computing system connected to a cloud environment, the computing system configured to:
      receive, from the mobile device, an image of the label captured by a camera of the mobile device;
      extract the cypher dot based identifier and the machine-readable representation from the captured image;
      convert the cypher dot based identifier to the unique cipher based identifier;
      obtain a first instance of the object identifier by decoding the unique cipher based identifier with the cypher key known to the cloud environment;

obtain a second instance of the object identifier by decoding the machine-readable representation;

verify authenticity of the physical object based on the first and second instances of the object identifier; and transmit the authenticity of the physical object to the mobile device.

2. The cloud-based system of claim 1, wherein the label is affixed to the physical object.

3. The cloud-based system of claim 1, wherein the machine-readable representation is a barcode.

4. The cloud-based system of claim 1, wherein the cypher dot based identifier is printed on the label using invisible ink.

5. The cloud-based system of claim 4, wherein the invisible ink is fluorescent ink that is excited under a light emitting diode flash, and wherein the image of the label is captured by the camera of the mobile device when the light emitting diode flash is on.

6. The cloud-based system of claim 1, wherein the computing system is further configured to establish communication between the cloud environment and the mobile device.

7. The cloud-based system of claim 6, wherein the authenticity of the physical object is dynamically verified via the cloud environment.

8. The cloud-based system of claim 1, wherein the computing system is further configured to generate the cypher dot based identifier corresponding to the machine-readable representation acquired from the captured image.

9. The cloud-based system of claim 1, wherein the cypher dot based identifier in the captured image is converted to the unique cypher based identifier using frequency domain matching.

10. An method for verifying authenticity of an item using a mobile device in communication with a cloud environment, the method comprising:

generating an unique cipher based identifier for the physical object by encoding an object identifier of the physical object with a cypher key;

converting the unique cipher based identifier to a cypher dot based identifier;

generating a machine-readable representation corresponding to the cypher dot based identifier based on the object identifier of the physical object; and printing the cypher dot based identifier and the machine-readable representation on a label;

receiving, from the mobile device, an image of the label captured by a camera of the mobile device;

extracting the cypher dot based identifier and the machine-readable representation from the captured image;

converting the cypher dot based identifier to the unique cipher based identifier;

obtaining a first instance of the object identifier by decoding the unique cipher based identifier with the cypher key known to the cloud environment;

obtaining a second instance of the object identifier by decoding the machine-readable representation;

verifying authenticity of the physical object based on the first and second instances of the object identifier; and transmitting the authenticity of the physical object to the mobile device.

11. The method of claim 10, wherein the label is affixed to the physical object.

12. The method of claim 10, wherein the machine-readable representation is a barcode.

13. The method of claim 10, wherein the cypher dot based identifier is printed on the label using invisible ink.

14. The method of claim 13, wherein the invisible ink is fluorescent ink that is excited under a light emitting diode flash, and wherein the image of the label is captured by the camera of the mobile device when the light emitting diode flash is on.

15. The method of claim 10, further comprising:

establishing communication between the cloud environment and the mobile device.

16. The method of claim 15, wherein the authenticity of the physical object is dynamically verified via the cloud environment.

17. The method of claim 10, further comprising:

generating the cypher dot based identifier corresponding to the machine-readable representation acquired from the captured image.

18. The method of claim 10, wherein the cypher dot based identifier in the captured image is converted to the unique cypher based identifier using frequency domain matching.

19. A non-transitory computer-readable medium storing instructions that are executable by a processing device, wherein execution of the instructions by the processing device causes the processing device to:

generate an unique cipher based identifier for the physical object by encoding an object identifier of the physical object with a cypher key;

convert the unique cipher based identifier to a cypher dot based identifier;

generate a machine-readable representation corresponding to the cypher dot based identifier based on the object identifier of the physical object; and print the cypher dot based identifier and the machine-readable representation on a label;

establish communication between a cloud environment and a mobile device;

receive, from the mobile device, an image of the label captured by a camera of the mobile device;

extract the cypher dot based identifier and the machine-readable representation from the captured image;

convert the cypher dot based identifier to the unique cipher based identifier;

obtain a first instance of the object identifier by decoding the unique cipher based identifier with the cypher key known to the cloud environment;

obtain a second instance of the object identifier by decoding the machine-readable representation;

verify authenticity of the physical object based on the first and second instances of the object identifier; and transmit the authenticity of the physical object to the mobile device.

* * * * *